United States Patent [19]
Brienza et al.

[11] Patent Number: 6,125,338
[45] Date of Patent: Sep. 26, 2000

[54] CONTOUR REPLICATING AND MEASURING DEVICE

[75] Inventors: David M. Brienza, Allison Park, Pa.; Michael J. Brienza, Easton, Conn.

[73] Assignee: University of Pittsburgh, Pittsburgh, Pa.

[21] Appl. No.: 09/064,466

[22] Filed: Apr. 22, 1998

[51] Int. Cl.[7] .................................................. G01B 5/20
[52] U.S. Cl. ........................... 702/167; 702/168; 425/4 R
[58] Field of Search .................................... 702/167, 168, 702/139; 425/2, 163, 165, 4 R; 249/160, 166

[56] References Cited

U.S. PATENT DOCUMENTS

| | | |
|---|---|---|
| 4,766,500 | 8/1988 | Yaniv et al. ............................. 358/482 |
| 4,890,235 | 12/1989 | Reger et al. ............................. 702/167 |
| 4,972,351 | 11/1990 | Reger et al. ............................. 702/168 |
| 4,998,354 | 3/1991 | Silverman et al. ..................... 33/514.2 |
| 5,243,971 | 9/1993 | Sullivan et al. . |
| 5,281,117 | 1/1994 | Hong .......................................... 425/2 |
| 5,470,590 | 11/1995 | Brubaker et al. .......................... 425/2 |
| 5,540,223 | 7/1996 | Starr et al. . |
| 5,647,357 | 7/1997 | Barnett et al. . |
| 5,655,527 | 8/1997 | Scarberry et al. . |

Primary Examiner—Marc S. Hoff
Assistant Examiner—Brian Bui
Attorney, Agent, or Firm—Thorp Reed & Armstrong, LLP

[57] ABSTRACT

A surface replicating and contour measuring device substantially comprises a mechanical pin array having calibration pins mounted on a frame, an imaging system for recording contour and a data processor for storing and manipulating the recorded information.

16 Claims, 4 Drawing Sheets

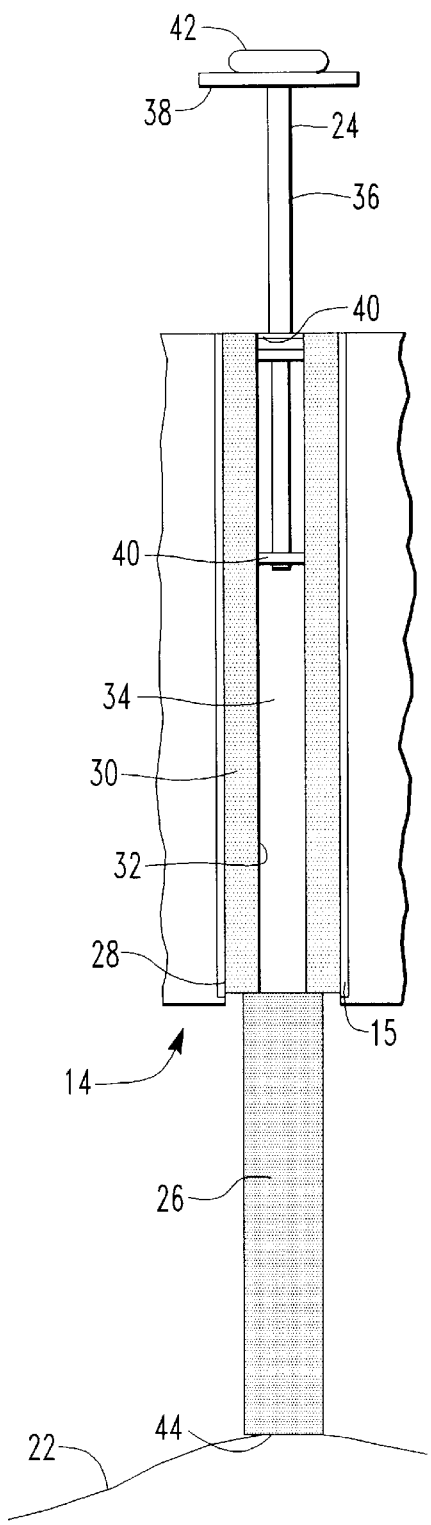
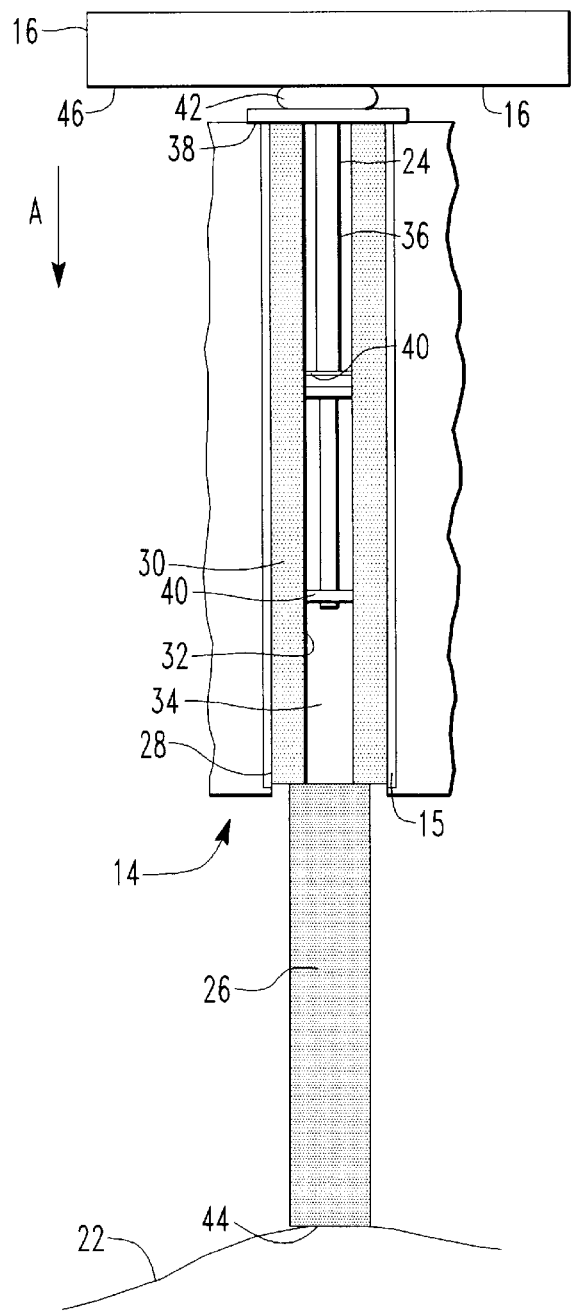
FIG. 3a
FIG. 3b

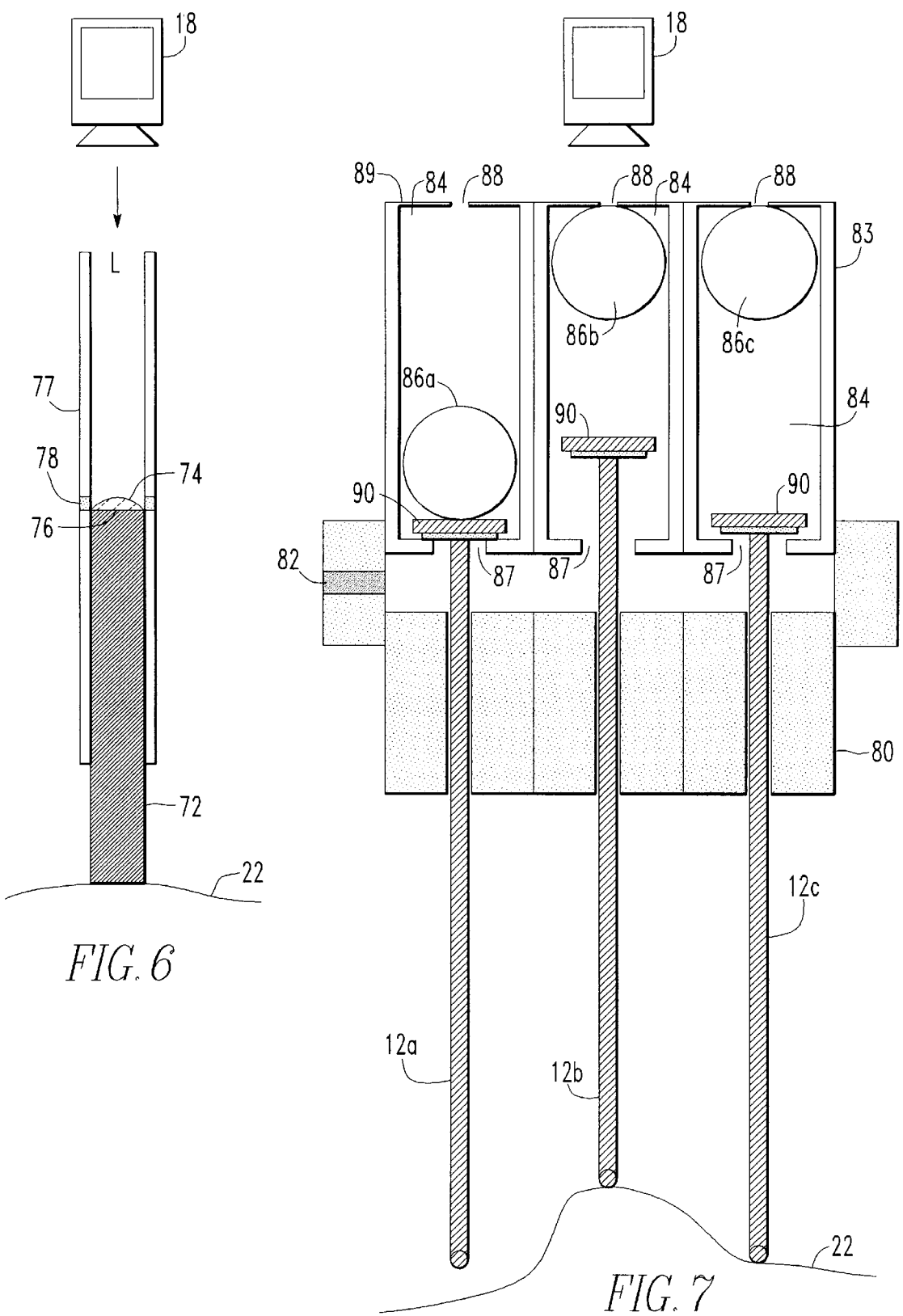

CONTOUR REPLICATING AND MEASURING DEVICE

BACKGROUND OF THE INVENTION

1. Field of the Invention

This invention concerns the method and apparatus for replicating and measuring a contour. More particularly, the present invention concerns the method and apparatus for replicating and measuring a contour wherein the apparatus substantially comprises a mechanical pin array mounted on a frame and having calibration pins, an imaging system that records the moment of contact between the pin array and the contour and a data processor for storing and manipulating the recorded information.

2. Description of the Related Art

One conventional type of device used for replicating a three-dimensional contour surface is a reusable die for the manufacture of molded seat cushions that comprises a plurality of rods slideably mounted on a platform wherein the platform is brought into contact with the surface contour and the rods are then locked into position by a locking device and a wall of the foam mold for the seat cushion is formed over the negative profile of the surface contour formed by the rods. This type of conventional surface contour replication device is described in U.S. Pat. No. 5,470,590 issued to Brubaker et al. The drawbacks to this type of surface contour replication device is that the rods must be manually locked in place with the locking device so that the foam cushion can be manufactured. The locking device makes the device complicated. Also, the position of the rods may not be accurate enough to create a surface contour that will not irritate the body part that the cushion contacts.

Another type of surface contour replication device is used to create a permanent seat cushion for a prescription wheelchair and comprises a plurality of actuators positioned on the seat and back portions of the wheelchair each having a rod attached to a piston and each attached to a force and position sensitive transducer. In operation, the patient is seated on the wheelchair and a force and distance distribution profile of the patient's contour is created. This data is then transferred to a fabrication machine to create the seat cushion for the wheelchair. An example of this type of surface contour replication device is described in U.S. Pat. No. 4,890,235 issued to Reger et al. A disadvantage to this type of surface contour replication device is that each actuator of the device has a transducer, which is very costly and results in a complicated design.

Nowhere in the cited related art is there disclosed a method and apparatus for replicating and measuring a contour wherein the apparatus replicates and measures the contour with extreme accuracy and has a simple design resulting in low cost. Therefore, there is a definite need for this the surface replicating and measuring device of the present invention which substantially comprises a mechanical pin array mounted on a frame having calibration pins, an imaging system that records the moment of contact between the pin array and the contour and a data processor for storing and manipulating the recorded information.

SUMMARY OF THE INVENTION

Accordingly, the present invention provides a contour replicating and measuring device substantially comprises a mechanical pin array mounted on a frame and having calibration rod members and an imaging system that records the contour and a data processor for storing and manipulating the contour data.

The present invention further provides for the mechanical pin array to form a matrix of rod members each having a optically-detectable structure that provides for the recording of the profile of the desired surface contour.

The present invention provides a contour replicating and measuring device, which accurately, inexpensively, and quickly measure the three-dimensional coordinates of a replication of a surface contour.

The present invention eliminates the need to take individual measurements of a vast amount of probes thereby simplifying the design.

The present invention provides for the imaging system to record the data contour in digital form for accuracy.

Other details, objects and advantages of the present preferred invention will become more apparent with the following description of the present preferred invention.

BRIEF DESCRIPTION OF THE DRAWINGS

The accompanying drawings describe the present preferred invention in which:

FIGS. 3a and 3b are cross-sectional side views of one of the plurality of rod members wherein FIG. 3a illustrates one of the plurality of the rod members in a fully extended position and FIG. 3b illustrates one of a plurality of the rod members in a slightly collapsed position.

FIG. 6 is a cross-sectional side view of yet another rod member that can be used in the contour replicating and measuring device of the present invention wherein the pin has a reflective top portion and the tubular outer member has a phosphorous ring.

FIG. 7 is a cross-sectional view of another rod members that can be used with the contour replicating and measuring device of the present invention.

DETAILED DESCRIPTION OF THE PRESENT INVENTION

Although this invention is suitable for other uses it will be described as being used to replicate and measure the surface contour of a body part. Such description is for purposes of explanation and is not intended to limit the scope of this invention. For example, the present invention can also be used to replicate and measure the surface contour of any structure.

Figure 1:
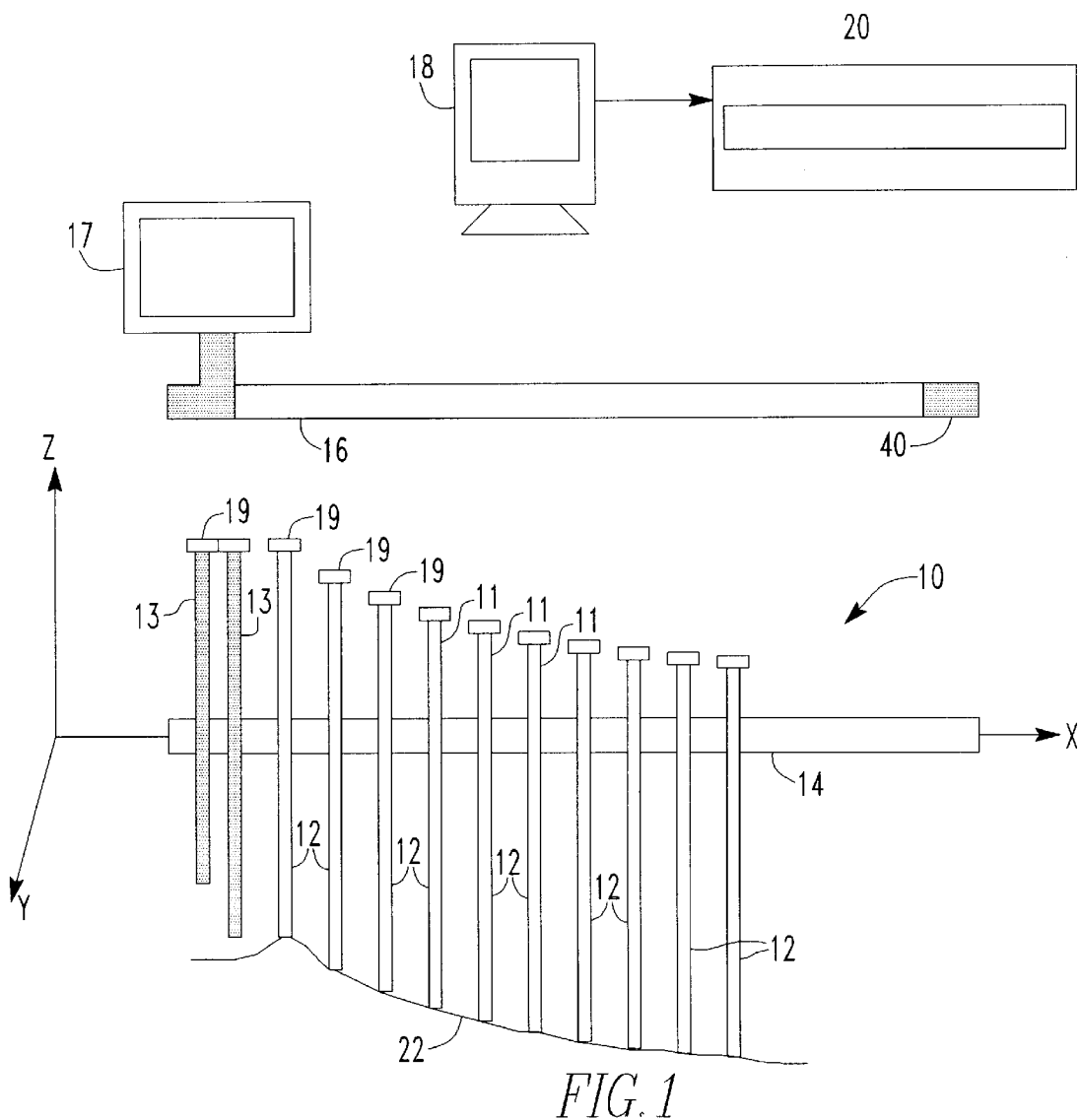
FIG. 1 illustrates a schematic drawing of the contour replicating and measuring device of the present invention.
Figure 2:
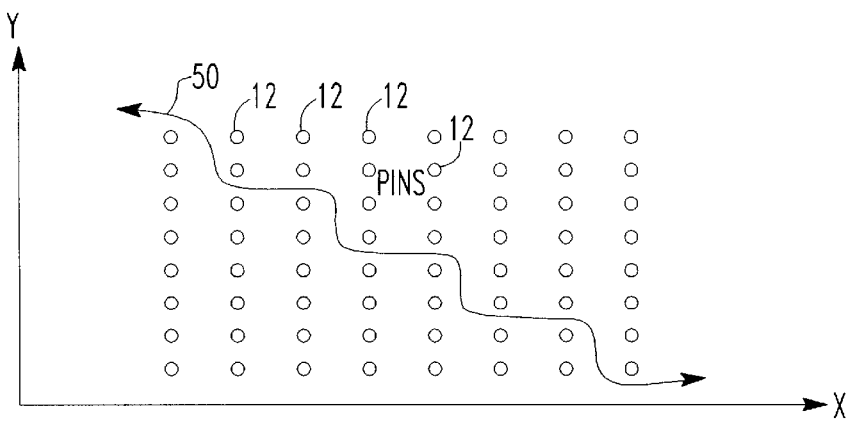
FIG. 2 is a top view of the mechanical pin array of the present invention, shown in FIG. 1 which illustrates a locking mechanism for the rod members.

FIG. 1 illustrates a schematic drawing of the contour replicating and measuring device 10 of the present invention which substantially comprises rod members 12 and calibration rod members 13 which form a mechanical pin array, a frame 14, a contacting plate 16, a drive mechanism 17 which moves the contacting plate 16, an imaging system 18 and a data processor 20. The rod members 12 and 13 are slideably received within a plurality of cavities (not numbered) of the frame 14 such that the rod members 12 and 13 can move in the z-direction. The frame 14 defines the x-axis. Although not shown in FIG. 1, the rod members 12 and 13 extend in the y-direction to form a two-dimensional pin array, as can be seen in FIG. 2. Each of the plurality of rod members 12 and 13 have a shaft 11 with a head portion 19 at the end of the shaft 11. In the relaxed state, the head portions 19 of the rod members 12 and 13 contact the frame 14 such that the shaft 11 substantially extends below the frame 14 and held with a friction force. The head portion 19 is made from elastic material to which a fluorescent dye has been added. The elastic material can be silicone and the dye can be Rodamyne 6G.

The number of rods members 12 used to form the pin array is dependent on the accuracy needed in the specific application. The more accurately that one wants to replicate and measure a contour, the more rod members 12 and 13 should be used. For instance, if the present invention is used to replicate and measure the surface contour of a human face, the number of rod members 12 and 13 would be greater in comparison to the number of rod members 12 and 13 used to replicate and measure the bottom of a foot.

The contacting plate 16 has a light source 40 on the edge thereof and is electronically attached to a drive mechanism 17 which moves the contacting plate 16 in the z-direction such that it contacts the rod members 12 and 13. The contacting plate 16 is made from transparent material. The imaging system 18 is a preferably a video camera; however, other types of imaging systems can be utilized. The video camera is electronically attached to the data processor 20 such that the data images of the rod members 12 and 13 are transformed into digital form and stored by the data processor 20.

FIG. 2 is a top view of the mechanical pin array of the present invention which illustrates a locking mechanism for the rod members 12. When replicating a soft tissue surface, the rod members 12 should move freely within the frame cavities in order that large forces are not placed on the rod members 12 and 13 which would distort the surface 22. Therefore it is necessary to provide a locking device which will prevent the rod members 12 and 13 from moving once they form the desired profile of the surface. The locking mechanism shown in FIG. 2 substantially comprises a thin, relatively strong, ribbon 50 of flexible material that is surpentined through the pin array of rod members 12 and 13. Under relaxed conditions, the ribbon would apply little or no friction to the sides of the rod members 12 and 13. But when the ribbon 50 is tensed, the ribbon 50 would apply a greater normal force to the sides of the rod members 12 resulting in a greater friction force on the rod members 12 and 13 than when the ribbon 50 was in a relaxed state. The tension on the ribbon can be varied during the contour replication process. When the rod members 12 form the desired profile, the tension can be increased to lock all the rod members 12. The tension could be applied by merely winding the ends of the ribbon 50 around the rod members 12 at the ends of the pin array. The ribbon 50 could be a fabric material such as silk or nylon or a non-woven material such as plastic material used for audio or video recording tape. The material of the ribbon 50 should be chosen based on desired friction properties.

Alternatively, the locking mechanism to hold the rod members 12 and 13 forming the established profile of the surface contour could be frictional forces between the shaft 11 of the rod members 12 and 13 and the frame 14. Specifically, the rod members 12 and 13 and the frame member could be sized and proportioned such that the rod members 12 and 13 are held in the established profile by frictional forces.

In operation, a two-step process is used, wherein the surface 22 is brought into contact with each of the rod members 12 and 13 such that the rod members 12 and 13 form the profile of the surface contour. The ribbon 50 is then tensed to hold the rod members 12 and 13 forming the profile in place. The surface 22 is then disengaged from the rod members 12 and 13. The contacting plate 16 is moved in the z-direction towards the rod members, and contacts the head 19 of the rod members 12 and 13. At the moment when the head 19 of each of the rod members 12 and 13 contacts the contacting plate 16, the head 19 immediately radiates a fluorescent light which is recorded by the video camera 18 through the transparent contacting plate 16. The light is trapped within the contacting plate 16 and it will not reach the head 19 until actual contact is made between the contacting plate 16 and the head 19. Because the light is trapped with the contacting plate 16 due to total internal reflections within the contacting plate 16, the light cannot escape until the conditions of total internal reflection are violated. Such violation occurs when the head 19 contacts the contacting plate 16 and some of the trapped light is transmitted to the head 19 and thereby cause fluorescence to occur in head portion 19. A detectable light will then be emitted by the head portion 19 and will then be transmitted to the video camera 18 which is positioned such that the video camera 18 is able to observe all the head portions 19 simultaneously and continuously. Because the wavelength spectrum of fluorescent radiation is well defined and distinctly different from possible light within the contacting plate 16, the visibility of the contact-induced fluorescent light can be further enhanced with the aid of an optical filter whose passband is coincident to the wavelength of the light emitted by the contact.

In a one-step process for replicating and measuring the contour of a surface an alternative embodiment of the rod members of the contour replicating and measuring device of the present invention as illustrated in FIGS. 3a and 3b can be used. The same reference numeral will be used throughout the application for similar elements. Referring back to FIG. 1, in general the contour replicating and measuring device substantially comprises a frame 14 with rod members 12 and calibration rod members 13 slideably attached thereto, a contacting plate 16 having a light source 20 and being electronically attached to a drive mechanism 17. The contour replicating and measuring device further has a imaging system 18 preferably in the form of a video camera which is electronically attached to a data processor 20.

FIGS. 3a and 3b are cross-sectional side views of one of the plurality of rod members 12 and 13 wherein FIG. 3a illustrates the rod members 12 and 13 in a fully extended position and FIG. 3b illustrates the rod members 12 and 13 in a slightly collapsed position. The rod member 12 and 13 has a cylindrical body 26 and a pin 24. The cylindrical body 26 has a shoulder 28 around the circumference of the exterior surface 30 and an interior surface 32 of the cylindrical body 26 defines a recess 34. The pin 24 has a shaft 36, a head 38 and two washers 40. The head 38 also has an elastic tip 42 to which a fluorescent dye has been added. The elastic material can be silicone to which a dye such as Rodamyne 6G has been added thereto. The pin 24 is slideably received in the recess 34. The frictional contact between the washers 40 and the interior surface 32 of the cylindrical body 26 prevents the pin 24 from moving within the recess 34 due to gravity. The pin 24 will move if acted upon by a force greater than the frictional force between the washers 40 and the interior surface 32.

The cylindrical body 26 is slideably received within the cavity 15 of the frame 14 such that cylindrical body contacts the shoulder 28 of the frame 14 and is prevented from sending completely through the cavity 15 due to gravity.

In operation, the rod members 14 are in the fully extended position, as shown in FIG. 3a, and the surface 22 moving in the z-direction is forced against each of the cylindrical bodies 26 of the rod members 12 and 13 such that the end portions 44 of the cylindrical bodies 26 form a profile which mimics the contour of the surface 22. The rod members 12 and 13 still in the fully extended position and remaining in contact with the surface 22 at the end portions 44 are then contacted by the surface 46 of the contacting plate 16 which is moved in the direction A of the surface 22. The contacting plate 16 contacts the head 42 of the rod members 12 and 13. At the moment when the head 42 of each of the rod members 12 and 13 contacts the contacting plate 16, the tip 42 immediately radiates a fluorescent light which is recorded by the video camera 18 through the transparent contacting plate 16. The light is trapped within the contacting plate 16 and it will not reach the tips 42 until actual contact is made between the contacting plate 16 and the tips 42. Because the light is trapped within the contacting plate 16 due to total internal reflections within the contacting plate 16, the light cannot escape until the conditions of total internal reflection are violated. Such violation occurs when the tips 42 contact the contacting plate 16 and some of the trapped light is transmitted to the tips 42 and thereby cause fluorescence to occur in tips. A detectable light will then be emitted by the tip 42 and will then be transmitted to the video camera 18 which is positioned such that the video camera 18 is able to observe all the tips 42 simultaneously and continuously.

Because the wavelength spectrum of fluorescent radiation is well defined and distinctly different from possible light within the contacting plate 16, the visibility of the contact-induced fluorescent light can be further enhanced with the aid of an optical filter whose passband is coincident to the wavelength of the light emitted by the contact.

As the contacting plate 16 continues to move along the z-axis in the direction A, the force of the contacting plate 16 on the pin 24 is greater than and overcomes the frictional force between the washers 40 and the interior surface 32 of the cylindrical body 26 and the pin 36 is forced within the recess 34. The video camera 18 will record the additional contours of the surface 22 as each of the pins 42 contacts the contacting plate 16 and emits a florescent light. The contacting plate 16 will continue to move along the z-axis until all rod members 12 and 13 are contacted.

Prior to moving the surface 22 into contact with the rod members 12 and 13, the calibration rod members 13 are positioned at a known z-value such that when the tips 42 of the calibration rod members 13 contact the contacting plate 16, the z-coordinate is known. The calibration rod members 13 are used to allow self-calibration of the measurement which obviates the need for a height position transducer. The video camera 18 directly records the position of the calibration rod members 13 recording the contact of the tips 42 of the calibration rod members 13 which can be identified by using a different color dye in the elastic material than that of the rod members 12 or knowing the x and y coordinates of the calibration rod members 13. The calibration rod members 13 can also be placed in a distinctive geometric pattern, perhaps at the perimeter of the frame 14. The measuring of the contact of the calibration rod members 13 with the contacting plate 16, would provide the necessary data to the data processor 20 to adjust all of the data to account for non-parallel altitudes of the frame 14 with respect to the contacting plate 16. Such a capability would substantially reduce the fabrication tolerances and alignment requirements in the mating of the frame 14 with the contacting plate 16 required for the acquisition of the data of the frame 14 and rod members 12 and 13. Standard computer-aided-design software is available that is capable of such three-dimensional, image rotational adjustments.

The various friction forces and masses of the rod members 12 and 13 can be adjusted for various applications so that the necessary force required to move the rod members 12 and 13 and pins 24 does not substantially distort the contour of the surface 22 to be measured. The washers 40 should only provide a friction drag sufficient to overcome the weight of the pin 24 such that pin 24 does not move due to gravity. The pins 24 could be straight pins in cotton fillings which could be substituted for the washers 40.

Figure 4:
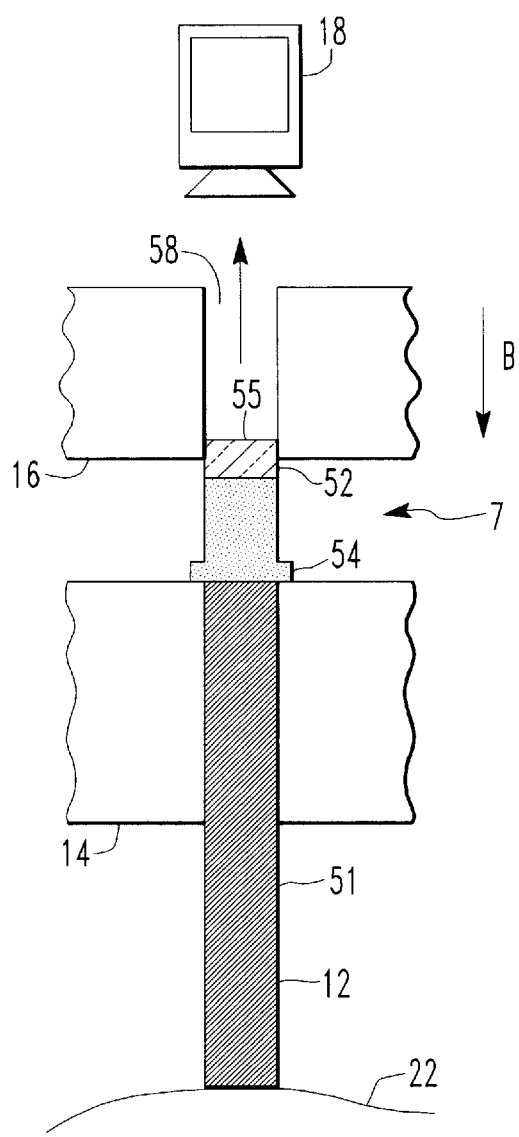
FIG. 4 is a cross-sectional side view of an alternative rod member that can be employed in the contour replicating and measuring device of the present invention wherein the rod member is positioned between the contacting plate and the frame.

FIG. 4 is a side view of an alternative embodiment of the rod members 12 and 13 of the present invention wherein the rod members 12 and 13 are positioned between the contacting plate 16 and the frame 14. This embodiment provides an alternative optically-detectable structure for sensing the moment and position at which the rod members 12 and 13 contact the contacting plate 16 which is then translated into the contour of the surface 22. The rod members 12 and 13 will be designated hereafter as 12 for the purpose of clarity; however, rod members 13 can also take the following forms. Rod members 12 are elongated shafts 51 having a transparent portion 52 at one end 55 of the shaft 51 and an opaque portion 54 adjacent the transparent portion 52. While the rod members 12 are contacting the surface 22 and form the profile which mimics the contour of the surface 22, the contacting plate 16 is move in direction B towards the frame 14. Light L is emitted in between the frame 14 and the contacting plate 16 such that when the end 55 passes through the cavity 58 defined by the contacting plate 16, the opaque portion 54 of the rod member 12 will block light L from passing through the cavity 58. The video camera 18 will visually record the light then the dark.

Figure 5:
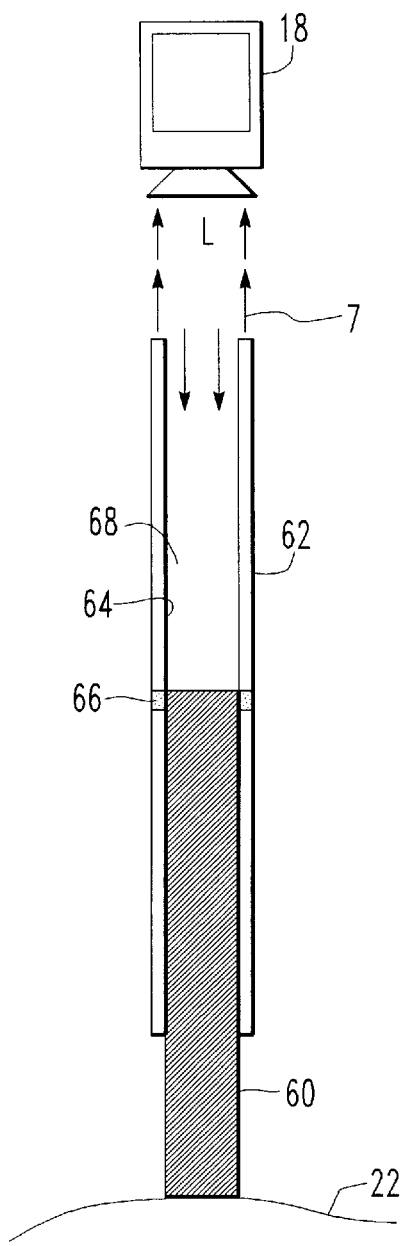
FIG. 5 is a cross-sectional side view of another rod member that can be used in the contour replicating and measuring device of the present invention wherein the pin of the rod member is placed within a tubular member having silvered walls.

FIG. 5 is a cross-sectional side view of another embodiment of the rod member 12 of the present invention wherein the pin 60 of the rod member is placed within a tubular member 62 having a silvered wall 64. This embodiment provides for another way to optically detect the moment and position that the rod members 12 impact the contacting plate 16. The rod member 12 is a shaft 60 which is slideably positioned within a tubular member 62 having a silvered interior wall 64 and a band 66 extending around the tubular member 62 at a known height. Light L is emitted in the recess 68 of the tubular member 62 such that a dark pattern is recorded where the band 66 is located along the interior wall 64 at the known height of the tubular member 62. As each of the rod members 12 forming the profile that mimics the contour of surface 22 are moved simultaneously though the tubular members 62, the shaft 60 will block the light L from being transmitted to the band 66 and no dark spot will be recorded by the video camera 18.

FIG. 6 is a cross-sectional side view of another embodiment of the rod members 12 and 13 of the present invention wherein the pin has a reflective white top portion and the tubular outer member has a phosphorous ring. This embodiment which provides another optically detectable structure to record the moment and position that the rod members 12 and 13 impact the contacting plate 16. The rod member 12 is a shaft 72 with a reflective white top 74 on the end 76 of the shaft 72. The rod member 12 is received within a tubular member 77, which has a phosphorous ring 78 extending around the circumference of the tubular member 77. Each of the rod members 12 forming the profile that mimics the contour of surface 22 are moved simultaneously though the tubular members 62. As long as the phosphorous ring 78 is between the video camera 18 and the reflective top 74, the light L traveling within the tubular member 77 will be reflected by the top 74 and excite the phosphorous ring which will be recorded by the video camera 18. But as the reflective top 74 passes the phosphorous ring and is positioned between the phosphorous ring 78 and video camera 18 the color of the phosphorous ring 78 will not be recorded by the video camera 18.

FIG. 7 is a cross-sectional view of the rod members in various positions with respect to the surface contour 22 which provides another optically detectable structure for the recording the moment and position that the rod members 12 and 13 impact the contacting plate 16. The structure of the rod members 12 include lower pin block guide 80, a positive air pressure manifold 82, a housing 83 having segregated compartments 84, and a plurality of lightweight white balls 86. The number of balls 86 equal the number of rod members 12. The top surface 89 of the housing 83 is preferably glass and defines holes 85. The housing 83 further defines bottom openings 87. Although, not illustrated the housing 83 can consist of a single compartment.

In operation, as soon as the rod members 12 contacts the surface 22, the head 90 of the rod members 12 moves upward and opens the valve created by the head 90 of the rod members 12 and the bottom openings 87 of the housing 83 and a slight positive pressure is created which pushes the balls 86 to the top of the housing such that the white color of the balls 86 fill the holes 88 when looking down on the top surface 89. Thus, the video camera 18 will record the changing of the holes 88 from dark to light which corresponds to the rod members 12 initially not being in contact with the surface 22 and then contacting the surface 22. Specifically, rod member 12a illustrates a rod member that is not contacting the surface 22 and therefore, the ball 86a is sitting on the head 90 and is not contacting the hole 84. Rod member 12b illustrates a rod member 12 that has been in contact with the surface 22 previously and is still in contact with the surface 22. The ball 86b is pushed up by the positive air pressure and the video camera 18 records the color white filing the hole 88. The rod member 12c illustrates a rod member 12 that has just contacted the surface 22 and as a result the ball 86c is pushed up by the air pressure flowing through the bottom opening 87.

While the present invention has been described herein, it is distinctly understood that the invention is not limited thereto but may be otherwise variously embodied in the scope of the following claims and any equivalent thereof.

We claim:

1. A contour replicating and measuring device comprising:

(a) a frame member defining a plurality of cavities;

(b) a plurality of rod members slideably positioned in the plurality of cavities;

(c) at least one calibration rod member slideably positioned in at least one of the plurality of cavities;

(d) a two-dimensional imaging system for recording the moment of contact of the plurality of rod members with a contour; and (e) a data processor for storing and manipulating the information recorded by the two-dimensional imaging system.

2. The contour replicating and measuring device of claim 1, wherein the imaging system is a video camera.

3. The contour replicating and measuring device of claim 1, further comprising a contacting plate.

4. The contour replicating and measuring device of claim 1 wherein the contacting plate is a transparent material and has a light source that emits light through the contacting plated.

5. The contour replicating and measuring device of claim 1, wherein the plurality of rod members are a transparent material.

6. The contour replicating and measuring device of claim 1, wherein the plurality of rod members each comprises (a) a cylindrical body having an interior surface, an exterior surface which defines a recess;

(b) a pin having a shaft and a head wherein the head has a tip made from an elastic material that has dye therein.

7. The contour replicating and measuring device of claim 1, further comprising a locking mechanism for holding the plurality of rod members is a desired position.

8. The contour replicating and measuring device of claim 7, wherein the locking mechanism is a ribbon.

9. The contour replicating and measuring device of claim 7 wherein the locking mechanism is at least one washer.

10. The contour replicating and measuring device of claim 9, wherein the optically-detectable structure a transparent portion positioned adjacent to an opaque portion of each of the plurality of rod members.

11. The contour replicating and measuring material of claim 9, wherein the optically-detectable structure is tubular member having a silvered interior wall and a band.

12. The contour replicating and measuring device of claim 9, wherein the optically-detectable structure is a reflective top on the end of the shaft of each of the plurality of rod members and a tubular member having a phosphorous ring.

13. The contour replicating and measuring device of claim 9, wherein the optically-detectable structure is a housing, a positive air pressure manifold, a plurality of lightweight objects contained within the housing wherein the housing has a top surface defining a plurality of holes therein and a bottom surface defining a plurality of openings therein such that the plurality of rod members extend through the plurality of openings.

14. The contour replicating and measuring device of claim 1, wherein each of the plurality of rod members have an optically-detectable structure.

15. A one-step process for replicating and measuring a surface contour comprising the steps of:

(a) bringing into engagement the surface contour with one end of each of a plurality of rod members of a pin array;

(b) progressively moving a transparent contacting plate with a light source into engagement with the other end of each of the plurality of rod members while maintaining engagement with the surface contour and the plurality of rod members, wherein the other end of each of the plurality of rod members has a head portion containing a florescent dye that is illuminated when each of the heads contacts the contacting plate;

(c) recording the contact between the contacting plate and each of the plurality of rod members by a two dimensional imaging system;

(d) transferring the recorded images to a data processor; and (e) transforming the recorded images into a surface profile of the contour surface.

16. A two-step process for replicating and measuring a surface contour comprising the steps of:

(a) bringing into engagement the surface contour with one end of each of a plurality of rod members of a pin array such that the profile of the ends of the plurality of rod members mimic the surface contour;

(b) locking the plurality of rod members such that the plurality of rod members maintain the profile after the surface contour is disengaged from the plurality of rod members;

(c) disengaging the surface contour from the plurality of rod members;

(d) progressively moving a transparent contacting plate with a light source into engagement with the other end of each of the plurality of rod members, wherein the other end of each of the plurality of rod members has a head portion containing a florescent dye that is illuminated when the contacting plate contacts the head portion;

(e) recording the contact between the contacting plate and each of the plurality of rod members by a two dimensional imaging system;

(f) transferring the recorded images to a data processor; and (g) transforming the recorded images into a surface profile of the contour surface.

* * * * *